(12) United States Patent
Teoh et al.

(10) Patent No.: US 9,366,425 B2
(45) Date of Patent: Jun. 14, 2016

(54) LIGHT EMITTING DIODE (LED) DISPLAY FOR A PORTABLE COMMUNICATION DEVICE

(71) Applicant: MOTOROLA SOLUTIONS, INC, Schaumburg, IL (US)

(72) Inventors: Wooi Ping Teoh, Penang (MY); Peng Khoon Cheah, Penang (MY); Weng Kong Hor, Penang (MY); Soh Peng Lim, Pulau Pinang (MY); Lee Sun Ooi, KDH (MY); Wei Ling Tham, Penang (MY)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 189 days.

(21) Appl. No.: 14/455,053

(22) Filed: Aug. 8, 2014

(65) Prior Publication Data

US 2016/0040870 A1 Feb. 11, 2016

(51) Int. Cl.
| | |
|---|---|
| *F21S 4/00* | (2016.01) |
| *F21V 21/00* | (2006.01) |
| *F21V 33/00* | (2006.01) |
| *F21V 15/01* | (2006.01) |
| *F21K 99/00* | (2016.01) |
| *F21V 11/14* | (2006.01) |
| *F21V 23/04* | (2006.01) |
| *H04B 17/23* | (2015.01) |
| *H04M 1/02* | (2006.01) |
| *F21Y 105/00* | (2016.01) |
| *F21W 111/10* | (2006.01) |

(52) U.S. Cl.
CPC ............... *F21V 33/0056* (2013.01); *F21K 9/58* (2013.01); *F21V 11/14* (2013.01); *F21V 15/01* (2013.01); *F21V 23/0464* (2013.01); *H04B 17/23* (2015.01); *H04M 1/0266* (2013.01); *F21W 2111/10* (2013.01); *F21Y 2105/001* (2013.01)

(58) Field of Classification Search
CPC .......... F21K 9/58; F21V 11/14; F21V 15/01; F21V 23/0464; F21V 33/0052; F21V 33/0056; H04B 17/23; H04M 1/0266
USPC ............... 362/86, 97.1, 97.4, 249.02, 249.05, 362/311.02
See application file for complete search history.

(56) References Cited

U.S. PATENT DOCUMENTS

| | | | |
|---|---|---|---|
| 8,139,349 | B2 | 3/2012 | Lam et al. |
| 8,154,864 | B1 | 4/2012 | Nearman et al. |

(Continued)

FOREIGN PATENT DOCUMENTS

| | | |
|---|---|---|
| EP | 0 206 176 A2 | 12/1986 |
| EP | 2085807 A2 | 8/2009 |

(Continued)

OTHER PUBLICATIONS

International Search Report and Written Opinion for corresponding International Patent Application No. PCT/US2015/042337, mailed on Oct. 12, 2015.

*Primary Examiner* — Jason Moon Han
(74) *Attorney, Agent, or Firm* — Barbara R. Doutre (57) ABSTRACT

A light emitting diode (LED) display assembly is formed of a translucent plastic housing, a light diffuser film coupled to the translucent plastic housing, a light barrier gasket coupled to the diffuser film, and an LED module coupled to the light barrier gasket. The LED module comprises a plurality LEDs individually controlled for generating a light source to form a graphic on the surface of the translucent plastic housing.

26 Claims, 10 Drawing Sheets

(56) References Cited

U.S. PATENT DOCUMENTS

| | | |
|---|---|---|
| 8,172,097 B2 | 5/2012 | Nearman et al. |
| 8,319,320 B2 | 11/2012 | Inoue et al. |
| 2001/0022564 A1 | 9/2001 | Youngquist et al. |
| 2008/0090621 A1 | 4/2008 | Yokodate et al. |
| 2010/0061048 A1 | 3/2010 | Mills |
| 2011/0244930 A1 | 10/2011 | Kong et al. |
| 2012/0275182 A1 | 11/2012 | Chen |
| 2013/0169704 A1 | 7/2013 | Tanaka et al. |
| 2013/0314642 A1 | 11/2013 | Timmerman et al. |
| 2014/0049983 A1 | 2/2014 | Nichol et al. |

FOREIGN PATENT DOCUMENTS

| | | |
|---|---|---|
| JP | 2012-002968 A | 1/2012 |
| WO | 2012146316 A1 | 11/2012 |
| WO | 2014049952 A1 | 4/2014 |

LIGHT EMITTING DIODE (LED) DISPLAY FOR A PORTABLE COMMUNICATION DEVICE

FIELD OF THE DISCLOSURE

The present disclosure relates generally to light emitting diode (LED) displays, and more particularly to LED displays for communication devices.

BACKGROUND

Portable radios, such as two-way radios utilized in the public safety environment, often utilize a display as part of the user interface for conveying information in a visual format. The display typically used in a portable radio is a liquid crystal display (LCD). However, LCD displays tend to be formed of large assemblies which may not be appropriate for the smaller form factors of today's newer products. As such, alternative types of displays are being considered for communication products, particularly products used in the public safety environment.

A light emitting diode (LED) display is a flat panel display, which uses an array of light-emitting diodes as a video display. While LED displays provide a sleek look to consumer products, the glossy finish is not considered suitable to the public safety market. Additionally, LED displays are assembled using several process steps making them costly. Structural robustness chemical resistance, optical performance, lighting consistency, form factor and cost are all factors to be considered for products operating in the public safety environment.

Accordingly, there is a need for an LED display for a portable communication device that is suitable for the public safety environment.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, in accordance with the various embodiments an LED display for a portable communication device is provided. The LED display provided herein is formed of fewer components and using fewer process steps than former displays of consumer type devices. The LED display of the various embodiments provides a sleek yet robust form factor making it well suited for radios operating in the public safety environment. Hence, the LED display formed in accordance with the various embodiments provides improved structural robustness, chemical resistance, optical performance, lighting consistency, form factor and cost are all factors to be considered.

Figure 1:
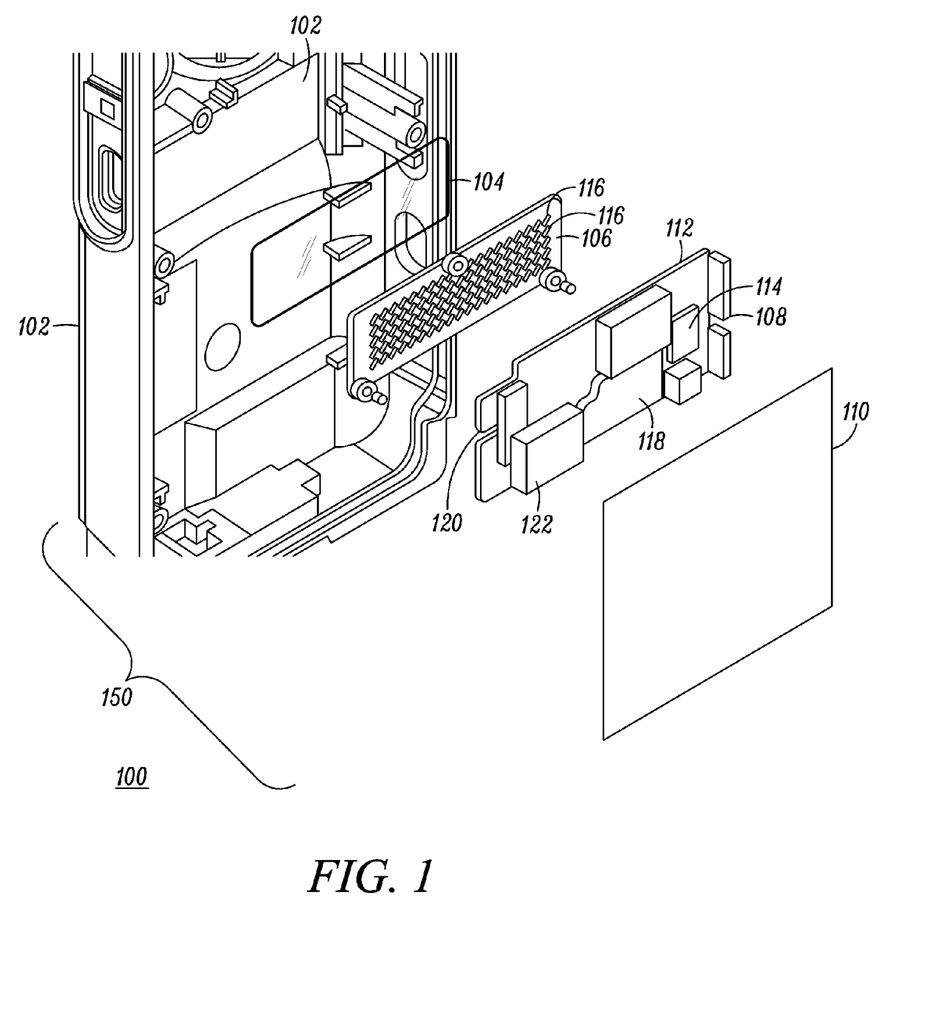
FIG. 1 is an exploded view of a radio and LED display assembly in accordance with the various embodiments.
Figure 2:
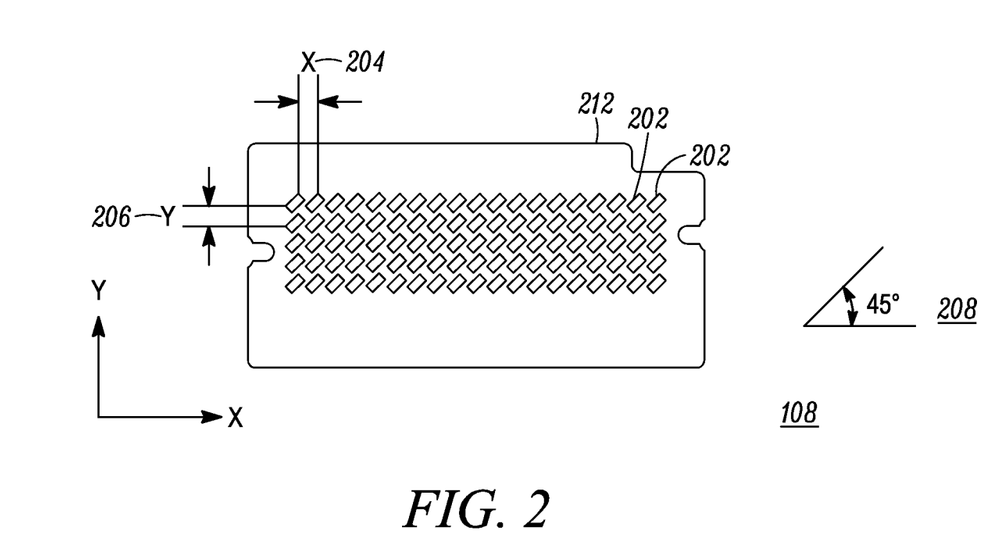
FIG. 2 is the LED module of FIG. 1 viewed from the front in accordance with the various embodiments.

FIG. 1 is an exploded view an LED display assembly 100 in accordance with the various embodiments. The LED display assembly comprises a translucent plastic housing 102, shows here as part of a radio housing, a light diffuser film 104, light barrier gasket 106, LED module 108, and backing 110. The LED module 108 comprises a printed circuit board (PCB) 112, driver IC 114, components 118, and connector 120. Dampeners in the form of foam pads 122 may also form part of the assembly The LEDs are shown in FIG. 2. The light barrier gasket 106 comprises a plurality of openings 116 comprising back slots and front dot holes in accordance with the various embodiments (to be shown in more detail in FIG. 3). The back slots are formed of rectangular recesses which in this embodiment are angled to match orientation of the LEDs. Other embodiments may utilize non-angled configurations as appropriate. The graphics can be customized by the user through the radio's controller. The assembly advantageously eliminates the use of a lens used in LCD type assemblies, such lenses have typically been perceived as fragile by radio users. The housing's translucent plastic material allows for an embedded display which minimizes water intrusion. The use of a black, translucent plastic housing provides more contrast with the LEDs than a totally transparent housing and thus the light output of the LEDs can be lower than that of a fully transparent housing. The light diffuser film 104 is placed in between the translucent housing 102 and the light barrier gasket 106.

FIG. 2 is the LED module 108 of FIG. 1 viewed from the front in accordance with the various embodiments. The LED module 108 comprises a plurality of LEDs 202 arranged in a matrix form and reflowed onto a PCB or a flex substrate 212. The LED matrix is arranged to form a dot to dot pitch in x and y direction 204, 206. The PCB or flex is connected to the display PCB 112 to power up the entire module 108. The plurality of LEDs are arranged in an angular arrangement to form a 45 degree incline which maximizes the number of LEDs and optimizer the do-to-dot pitch. This arrangement helps maintain the evenness of the dot separation and improve clarity. Sensors or other extended features can be added to the PCB, for example a light sensor can be added to the PCB to control the LED brightness in different environments. The LEDs are not used for illuminating a circuit board but rather are distributed as a matrix form convey information in the form of characters, numbers and icons which may be user controlled. The use of the LED matrix provides good LED alignment.

Figure 3:
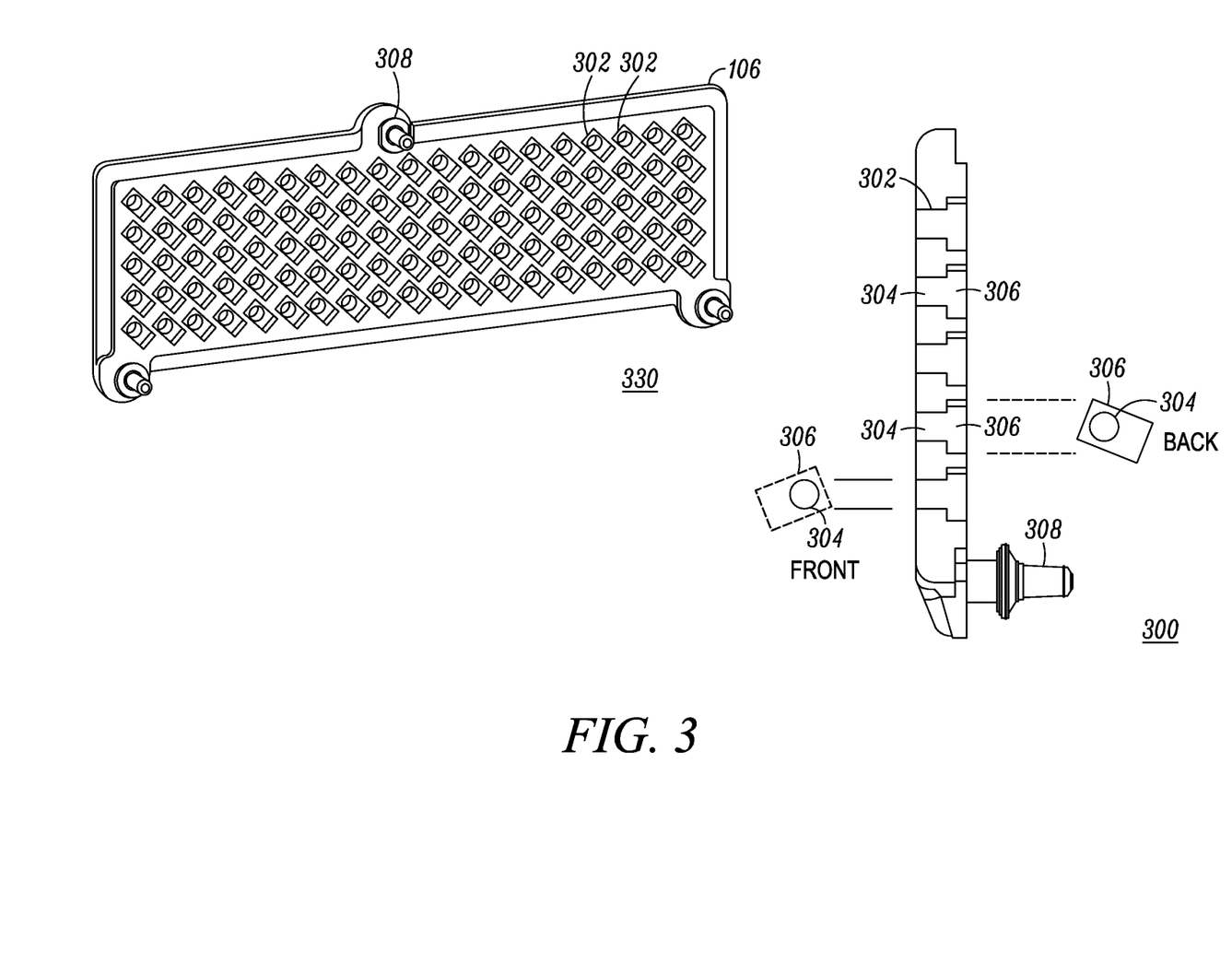
FIG. 3 is the light barrier gasket of FIG. 1 in accordance with the various embodiments.

FIG. 3 shows various views of the light barrier gasket of FIG. 1 in accordance with the various embodiments. View 300 shows back and side views of light barrier gasket 106. Light barrier gasket 106 may be made of silicone rubber or other thermoplastic polyurethane (TPU) or thermoplastic elastomer (TPE) type of material. The plurality of openings 116 is shown from the back as openings 302. The openings of the light barrier gasket 106 are formed in accordance with the various embodiments having a smaller opening, hole 304 on front surface 310 and a wider recessed opening, slot 306 on back surface 320. The smaller hole 304 on front surface 310 is circular in shape while the wider opening, slot 306 on back surface 320 is rectangular. The rectangular openings 306 are angled at substantially 45 degrees as was described in FIG. 2. The overall thickness of the light barrier is for example in the range of 2-5 mm to further operate as an impact absorber to protect the LED and the module. The light barrier gasket 106 is molded in black to absorb light and prevent light leakage to the external surface. The recessed rectangular openings 306 provide back slots for housing each individual LED 202 separately to minimize leakage between LEDs. The small hole 304 is used to control dot size and pitch. The small hole 304 is aligned with the LED hot spot. In this particular example, the LED hot spot is off-center and thus the small hole position is accordingly off-center. This off center alignment, although not required, provides additional control over the light distribution.

In accordance with a further embodiment, the openings 302 of the light barrier gasket 106 can be filled with air or any transparent or translucent material to provide a light pipe and additional control luminance and viewing angle. Light barrier gasket 106 is retained within the assembly 100 using a mounting mechanism 308 such as mounting posts, pins, screws or the like for aligning the light barrier gasket to a printed circuit of the LED module.

Unlike gaskets that are merely used for sealing, the light barrier gasket of the various embodiments operates as an impact absorber, light leakage prevention, and control of the dot pitch for information viewing. This is achieved through a back slot and front dot hole combination for each LED.

Figure 4:
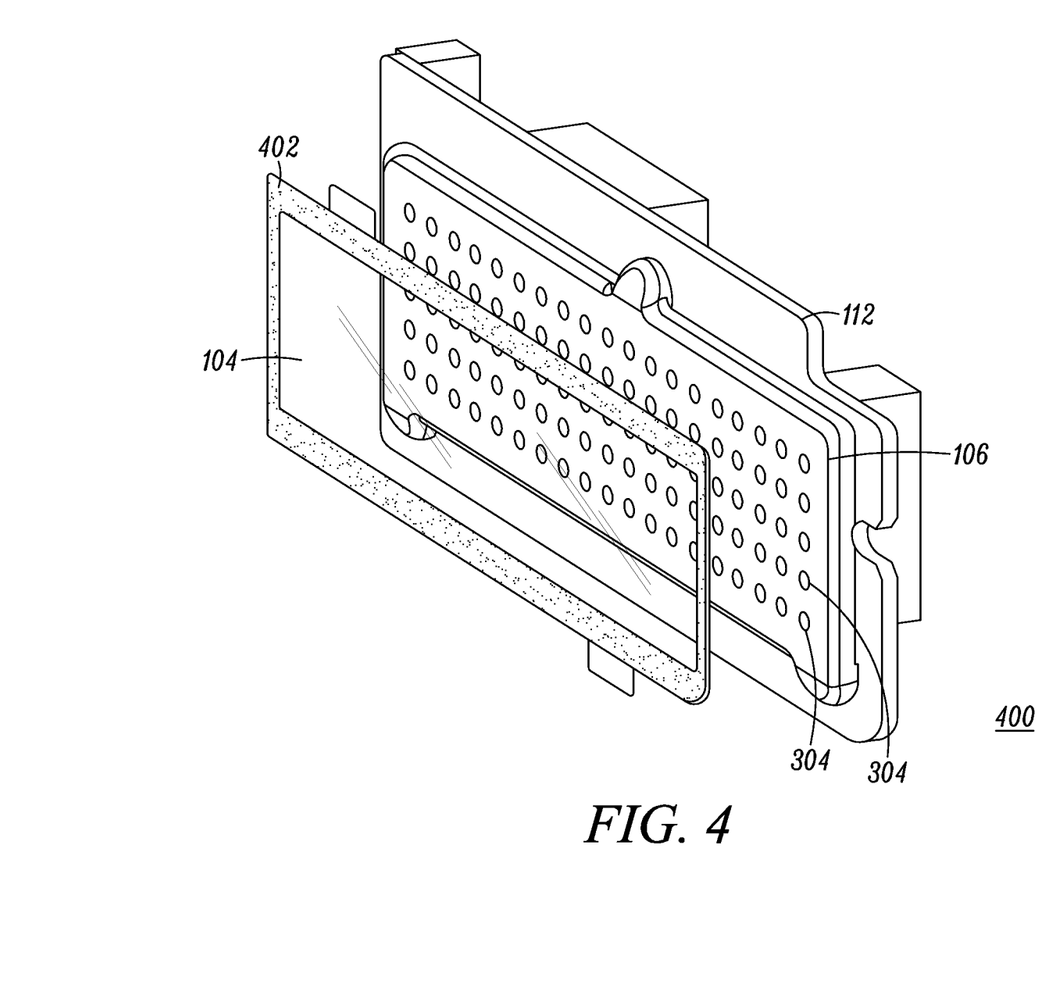
FIG. 4 is an exploded view of the LED display assembly in accordance with some embodiments.

FIG. 4 shows the light diffuser film 104 for mounting to the light barrier gasket 106 in accordance with the various embodiments. The light diffuser film 104 improves clarity and viewing angle. The light diffuser film 104 attaches to the light barrier gasket 106 using an adhesive 402. The use of a black adhesive advantageously prevents light leakage to the external surface.

Figure 5:
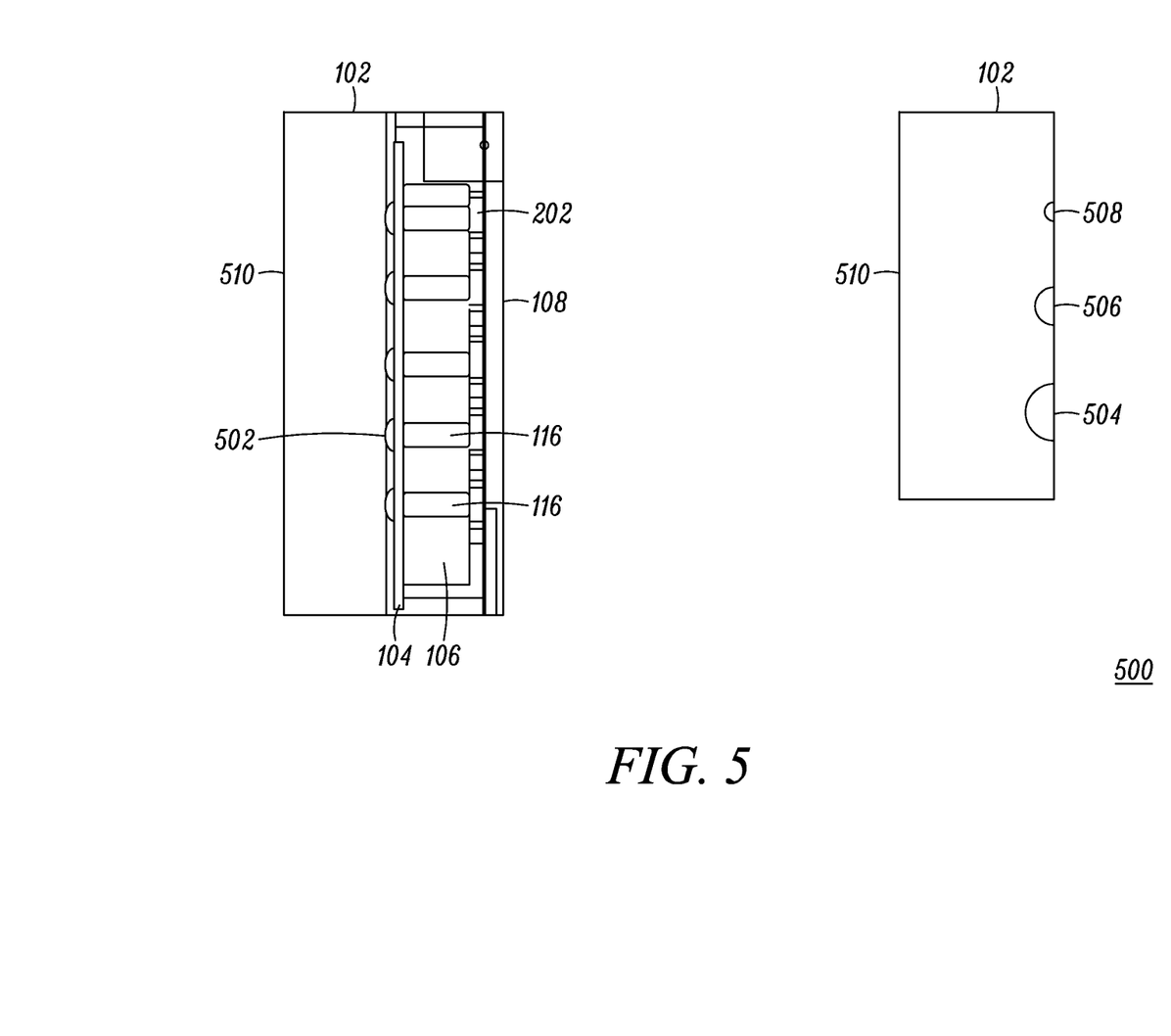

FIG. 5 is a cross-sectional view 500 of the LED display assembly within the translucent housing 102 in accordance with some embodiments. This view shows LED module 108 having the plurality of LEDs 202, light barrier gasket 106 having the plurality of openings 116 (comprising back slots and front dots holes) and light diffuser film 104. The translucent plastic housing 102 may be textured externally 510 to bend the LED light beam to increase LED display viewing angle. A textured external surface 510 further enhances the ruggedness desired for public safety radio applications.

In accordance with some of the embodiments, the black, translucent housing 102 may be further molded to comprise a plurality of concave shapes 502 for further controlling the appearance of the dot size. The plano concave shapes 502 align with the openings 116 of the light barrier gasket 106 and LEDs 202. Various plano concave shapes can be used. For example, plano concave shape 508 can be used for a small dot size, medium plano concave shape 506 can be used for a medium dot size and larger plano concave shape 504 can be used for a large dot size. The interior of the housing 102 is molded with the plano-concave shapes to allow the LED light beam to spread and widen the LED display viewing angle. The plano concave shapes molded on the interior surface of translucent housing 102 advantageously provide for increased flexibility in terms of graphic control and luminescence.

Figure 6:
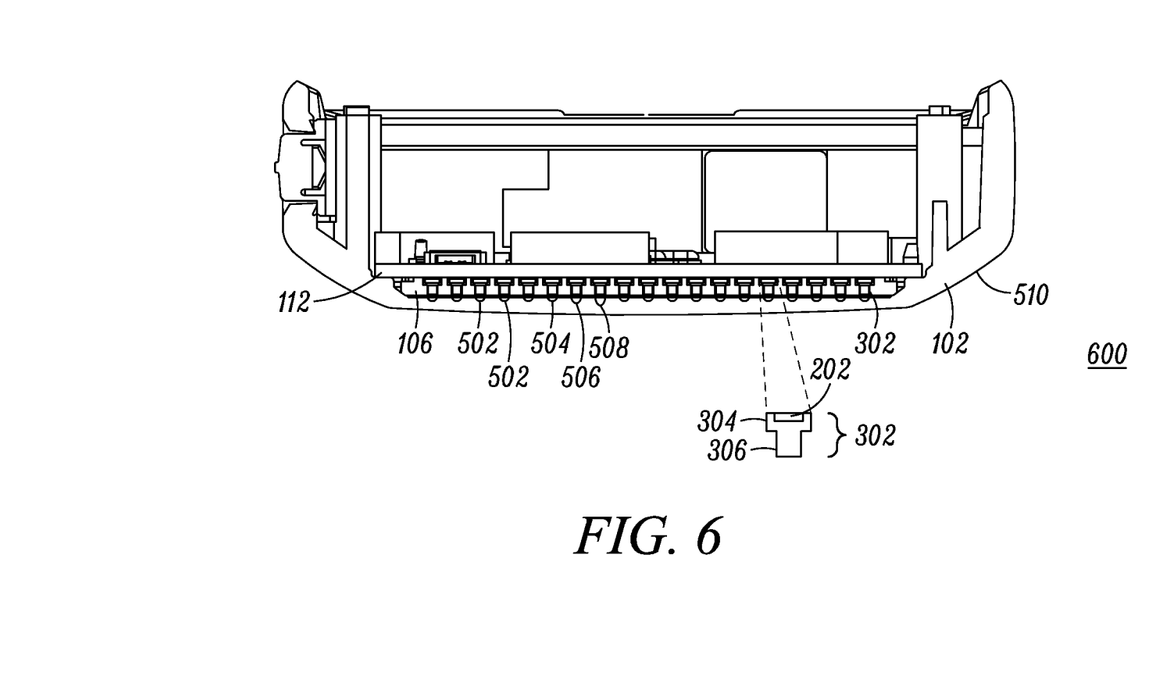
FIG. 6 is a cross-sectional view of the LED display assembly within the radio housing in accordance with some embodiments.

FIG. 6 is a cross-sectional view of the LED display assembly assembled within a radio 600, such as a public safety radio, in accordance with some embodiments. The translucent plastic housing 102 of the radio is textured externally to bend the LED light beam to increase LED display viewing angle. The interior surface of the translucent housing 102 comprises the plurality of plano concave shapes 502 molded therein, such as small plano concave shaping 504, medium plano concave shaping 506 and large plano concave shaping 508. The black, translucent housing 102 allows the LEDs to shine through the housing. The exterior surface 510 of translucent housing 102 is preferably textured. The housing thickness may be in the range of for example 0.8 mm-1.5 mm. The overall thickness range of the module (from the PCB 112 may be between 3-4 mm. Thus, the entire assembly is quite thin compared to past assemblies while still maintaining ruggedness.

The completed assembly provides good chemical resistance due to the integral approach that avoids the use of extra joints and openings which can lead to leaking and chemical corrosion. Additionally, the structural robustness of the assembly makes it resistant to drop impact in accordance with drop test specifications required of public safety radios.

Figure 7:
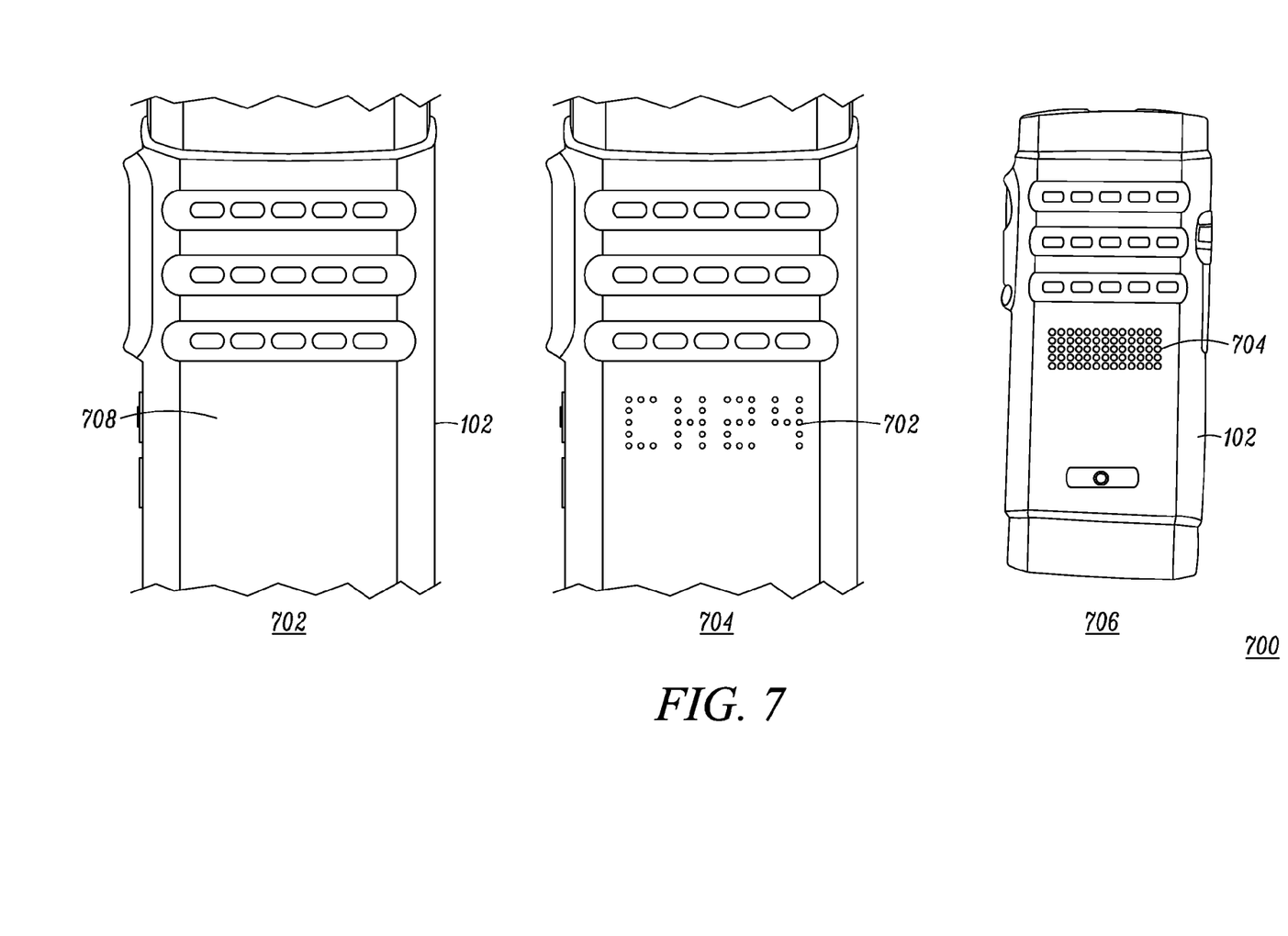
FIG. 7 is a radio comprising the LED display assembly in accordance with some embodiments.

FIG. 7 is a radio 710 comprising the LED display in accordance with some embodiments. In view 702 the LEDs are off and thus translucent housing 102 shows no display. In view 704, an example of a graphic such as channel indicator is shown with predetermined LEDs being turned on. In view 706, all the LEDs are on and shining through translucent housing 102. The exterior surface of translucent housing 102 is textured 708; the interior surface as previously described is molded with the plano concave shaping.

Figure 8:
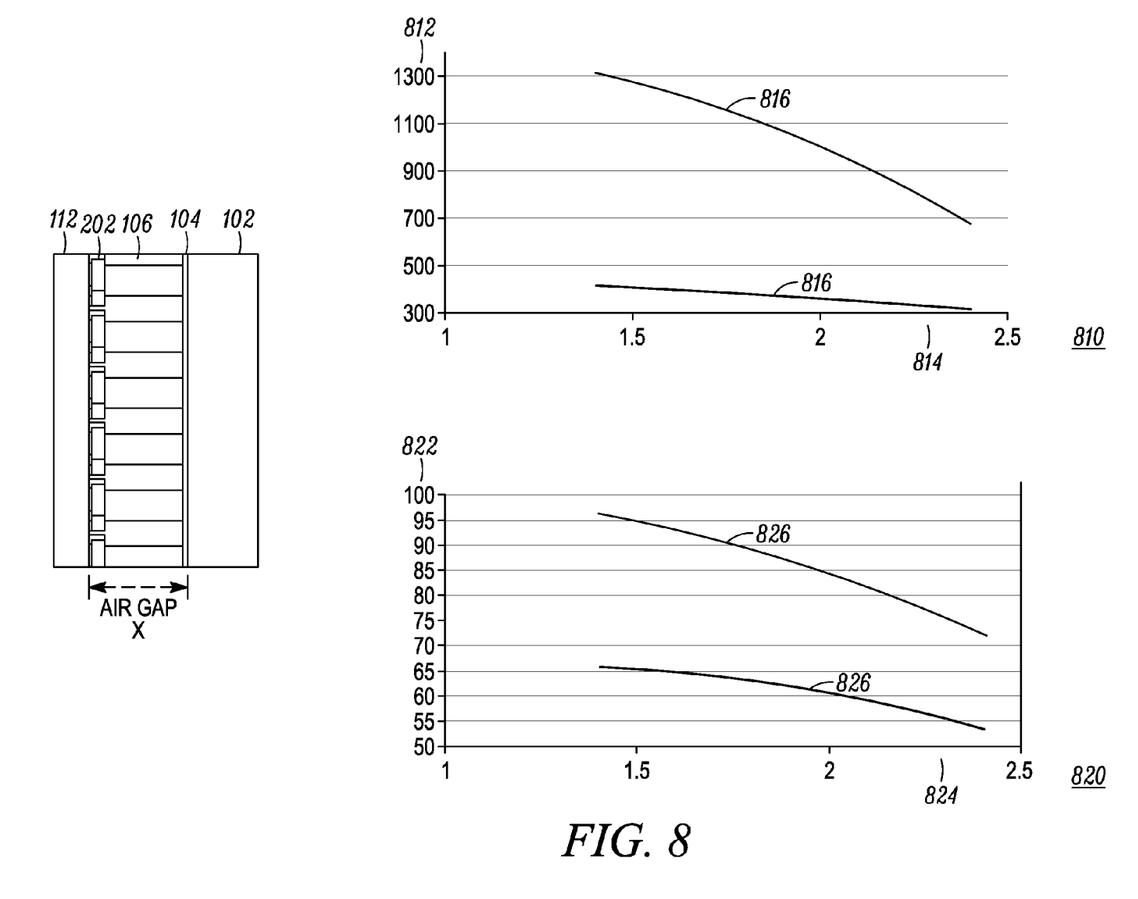
FIG. 8 is an example of sample data for an LED display assembly formed and operating in accordance with some embodiments.

FIG. 8 is an example of sample data for an LED display formed and operating in accordance with some embodiments. Graph 810 shows luminance (nits) 812 vs air gap (mm) 814. The air gap (X) was measured between the PCB 112 and the inner surface of translucent housing 102. Curve 816 was measured across an air gap ranging from 1.4-2.4 mm across translucent housing 102 with thickness 0.8 mm and translucent-transmission value 14.86% having luminance ranging from 700 nits to 1300 nits. Curve 818 was measured across an air gap ranging from 1.4-2.4 mm across translucent housing 102 with thickness 1.2 mm and translucent-transmission value 5.6% having luminance ranging from 340 nits to 400 nits. With a given current consumption, curve 816 and curve 818 represent working range for the embodiment. The design luminance is flexible to optimize through air gap, LED current consumption, housing thickness and material translucent-transmission value. Overall graph 810 shows that the LED display module formed in accordance with various embodiments can achieve good luminance value according to user preference.

Graph 820 shows viewing angle (degrees) 822 vs air gap X (mm) 824 at a maximum current of 2.6 mA (tested at spot size of 2000 micrometers). The air gap (X) was again measured between the PCB 112 and inner surface of the translucent housing 102. Curve 826 was measured across an air gap ranging from 1.4-2.4 mm across translucent housing 102 with thickness 0.8 mm and translucent-transmission value 14.86% having viewing angle ranging from 72 degrees to 96 degrees. Curve 828 was also measured across an air gap ranging from 1.4-2.4 mm across translucent housing 102 with thickness 1.2 mm and translucent-transmission value 5.6% having viewing angle ranging from 53 degrees to 66 degrees. Overall graph 820 shows that the LED display module formed in accordance with various embodiments can achieve good viewing angle.

Accordingly, the LED display assembly formed in accordance with the various embodiments provides good optical performance.

Figure 9A:
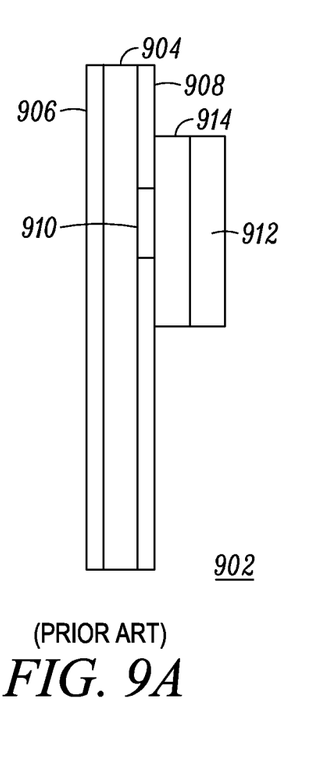
FIGS. 9A and 9B show first and second side view of the LED display assembly in accordance with some embodiments.
Figure 9B:
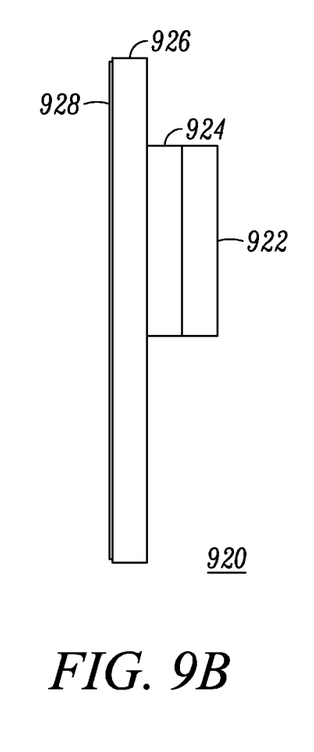

FIGS. 9A and 9B provide side views comparing first and second assemblies, the first assembly 902 shows a prior art LED display suitable for a consumer type product. Prior art assembly 902 comprises transparent plastic housing 904 having tinted external surface 906 and internal metal masked surface 908. The external and internal surfaces 906, 908 are formed through secondary processes for tinting and metallization which are required to mask the enclosure. A window opening 910 is used to allow light from the PCB having LED 912 to shine through. Sealing rubber 914 (having cut-out (not shown) seals the window. This approach is costly due to the additional process, and additionally the glossy surface 906 is not deemed appropriate for users in the public safety market desiring a highly ruggedized form factor.

Other techniques such as overmolding used in other LED display applications in consumer type products are also not sufficiently robust for public safety products in that they are unable to withstand such robustness tests as ball impact and drop. The chemical resistance of translucent silicone makes it unsuitable as a housing for the public safety radio environment. Clear transparent plastic also does not provide clear LED diffusion as the clear transparent plastic would cause strong direct hot spots which would not provide good userability.

Assembly 920 is an LED display assembly formed in accordance with the various embodiments. LED display assembly 920 comprises LED module 922, light barrier gasket 924, and translucent plastic housing 926 having textured exterior surface 928. The textured exterior surface 928 covers even where the LEDs shine through. The textured exterior surface 928 allows the LED light beam to bend and increases LED display viewing angle.

No secondary processes of masking or tinting are required. The overall translucent housing 926 negates the need for a window opening and seal. Thus, light barrier gasket 924 is not required for sealing but is used to provide the additional benefits of impact absorber, light leakage prevention and control of dot pitch. In accordance with a further embodiment, the openings of the light barrier gasket 924 (302 of FIG. 3) can be filled with air or any transparent or translucent material to provide a light pipe and additional control luminance and viewing angle. The LED display formed in accordance with the various embodiments utilizes few processes and is easier to assemble thereby reducing cost of the overall assembly. Additionally, plano concave shaping can be molded on the interior surface of translucent housing 926 such as was discussed in the description of FIG. 5 to allow the LED light beam to spread and the LED viewing angle to widen. The use of plano concave shapes molded on the interior surface can be sued to provide increased flexibility in terms of graphic control and luminescence.

Figure 10:
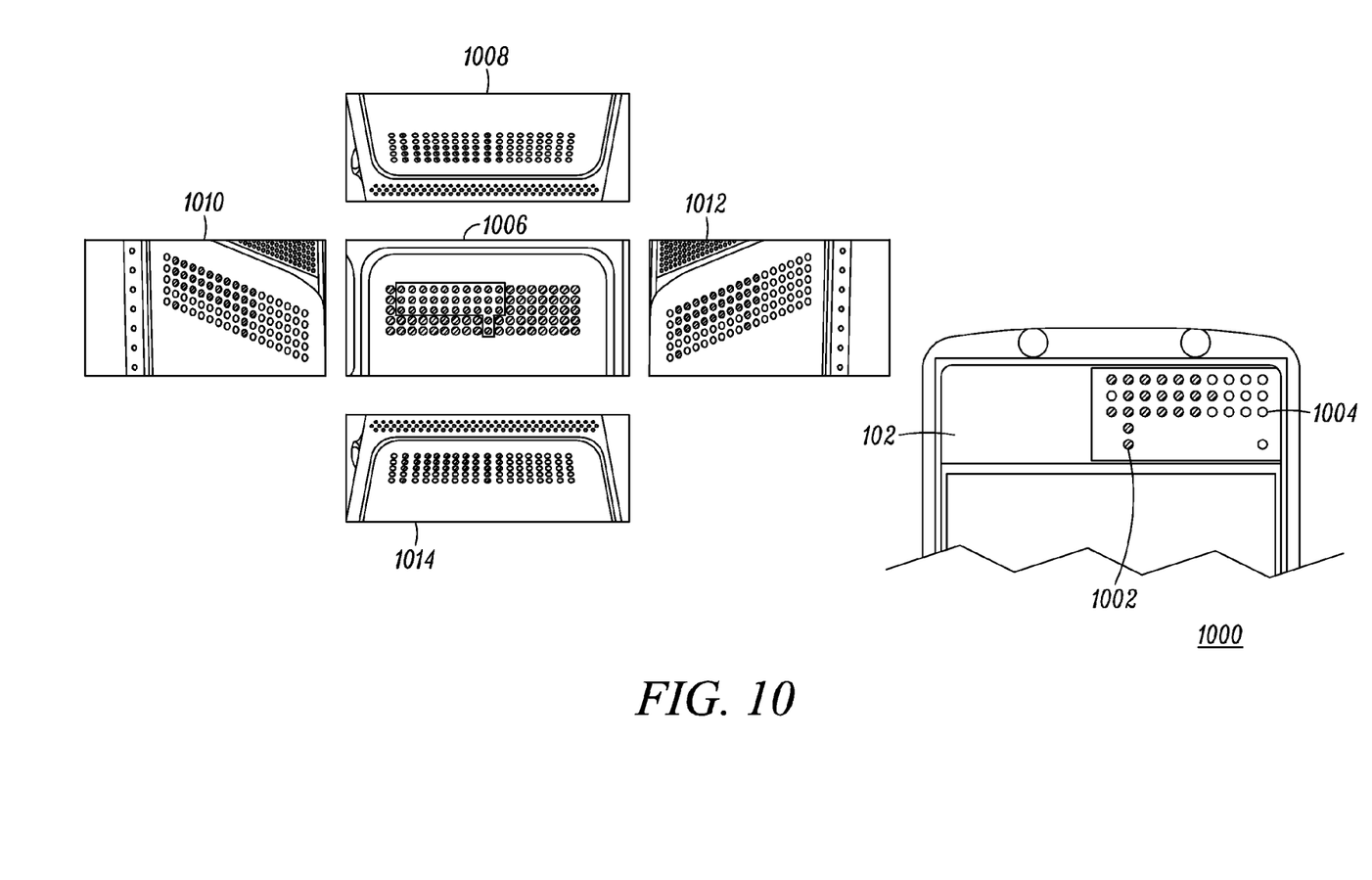
FIG. 10 shows examples of a variety of luminescent patterns generated by the LED display assembly in accordance with some embodiments.

FIG. 10 shows examples of a variety of luminescent views 1000 that can be achieved using the LED display assembly 150 in accordance with some embodiments. The use of different plano-concave shaping on the black, translucent housing 102 allows for larger dot sizes 1002 and smaller dot sizes 1004 dot sizes. The location of the hole and variety of dot sizes on the black translucent housing 102 advantageously provides for a variety of LED graphics to be viewed. These graphics are not just viewable from the front view 1006, but also viewable from a plurality of viewing angles, such as top view 1008, left view 1010, right view 1012 and bottom view 1014. Pre-programming of the radio or individual user control (for example via a radio keypad and radio controller) provides the user with flexibility to design and program the graphic, the graphic can scroll, blink and change patterns.

The LED display of the various embodiments has avoided the use of an independent housing thereby allowing for a small form a factor while maintaining robustness. The use of the LED matrix provides good LED alignment.

Accordingly, there has been provided an improved LED display assembly for a communication device. The LED display formed in accordance with the various embodiments provides improved structural robustness, chemical resistance, optical performance, lighting consistency, small form factor and reduced cost making it well suited to communication devices operating in the public safety environment. Users of portable, handheld public safety radios can benefit greatly from the improved viewing and graphics as well as the robustness and integrated form factor provided by the LED display assembly formed in accordance with the various embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

While the embodiments described have been applied to microcontrollers, it will be appreciated that some embodiments may alternatively be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A light emitting diode (LED) display assembly for a radio assembly, comprising:
    a translucent plastic housing for enclosing the radio assembly;
    a light diffuser film coupled to the translucent plastic housing;
    a light barrier gasket coupled to the diffuser film; and
    an LED module coupled to the light barrier gasket, the LED module comprising a plurality LEDs individually controlled for generating a light source to form a graphic.

2. The LED display assembly of claim 1, wherein the translucent plastic housing is textured externally to bend the LED light beam to increase LED display viewing angle.

3. The LED display assembly of claim 1, wherein the interior of the housing is molded with a plano-concave shape to allow LED light beams to spread and widen the LED display assembly's viewing angle.

4. The LED display assembly of claim 1, wherein the plano-concave shape controls dot size projected by the individual LEDs.

5. The LED display assembly of claim 1, wherein the light barrier gasket provides an impact absorber, light leakage prevention and control of dot pitch/size.

6. The LED display assembly of claim 1, wherein openings of the light barrier gasket are filled with a transparent or translucent material.

7. The LED display assembly of claim 6, wherein the transparent or translucent material operate as a light pipe for control of luminance and viewing angle.

8. The LED display assembly of claim 1, wherein the light barrier gasket comprises a plurality of holes on an upper surface for controlling dot size and pitch.

9. The LED display assembly of claim 8, wherein the plurality of holes are formed within a plurality of recessed slots on a bottom surface to individually house each of the plurality of LEDs.

10. The LED display assembly of claim 9, wherein the plurality of slots on the bottom surface prevents light leakage between the plurality of LEDs.

11. The LED display assembly of claim 1, wherein the light barrier gasket further comprises a mounting mechanism for aligning the light barrier gasket to a printed circuit of the LED module.

12. The LED display assembly of claim 1, wherein the light barrier gasket comprises silicone rubber, thermoplastic polyurethane (TPU) or thermoplastic elastomer (TPE) material.

13. The LED display assembly of claim 1, wherein the light barrier gasket provides impact absorption.

14. The LED display assembly of claim 13, wherein the overall thickness of the light barrier gasket is within a range of 2-5 mm.

15. The LED display assembly of claim 1, wherein the light diffuser film controls display clarity and viewing angle.

16. The LED display assembly of claim 1, wherein the diffuser film is attached to the light barrier gasket using an adhesive thereby minimizing light leakage to an external surface.

17. The LED display assembly of claim 1, wherein the LED module comprises a printed circuit board, a driver IC, and connector.

18. The LED display assembly of claim 1, wherein the graphic provided by the plurality of LEDs is user controlled.

19. The LED display assembly of claim 1, wherein an exterior surface of the translucent housing is textured, and an interior surface of the translucent housing comprises plano concave shaping molded therein.

20. The LED display assembly of claim 1, wherein the plurality of LEDs are arranged in a matrix form on a printed circuit board (PCB).

21. The LED display assembly of claim 1, wherein the plurality of LEDs are arranged in a matrix form on a flex substrate.

22. The LED display assembly of claim 1, wherein the plurality of LEDs are arranged at a 45 degree incline.

23. The LED display assembly of claim 1, wherein the module further comprises sensors for automatically controlling LED brightness within different operating environments.

24. The LED display assembly of claim 1, wherein the light barrier gasket comprises:
- a plurality of recessed slots on a bottom surface of the light barrier gasket to individually house each of the plurality of LEDs; and
- a plurality of holes on an upper surface of the light barrier gasket, each hole being associated with a recessed slot, the plurality of holes for controlling dot size and pitch.

25. The LED display assembly of claim 24, wherein the translucent housing comprises an exterior textured surface and an interior surface having plano concave shaping molded therein.

26. The LED display assembly of claim 1, wherein the translucent housing comprises a portable radio housing.

* * * * *